United States Patent Office 3,822,237
Patented July 2, 1974

3,822,237
REACTION PRODUCTS OF POLYEPOXIDE AND EXCESS DI-2-OXAZOLINE
John A. Alford, Ben A. Tefertiller, Jr., and Donald A. Tomalia, Midland, Mich., assignors to The Dow Chemical Company, Midland, Mich.
No Drawing. Continuation of abandoned application Ser. No. 191,786, Oct. 22, 1971. This application Aug. 17, 1973, Ser. No. 389,401
Int. Cl. C08g 30/14
U.S. Cl. 260—47 EN                             5 Claims

ABSTRACT OF THE DISCLOSURE

This invention concerns linear, curable polymeric materials prepared by reaction of a polyepoxide with an excess of di-2-oxazoline, and to cured products produced therefrom which are particularly suited as self-adherent corrosion and chemical resistant coatings for metals.

---

This is a continuation of application Ser. No. 191,786, filed Oct. 22, 1971, and now abandoned.

BACKGROUND

Di-2-oxazolines are known in the literature as being useful as crosslinking agents for polyepoxide resins, e.g. as disclosed in Belgian Pat. No. 752,047 issued Dec. 16, 1970. Heretofore, however, at least equal molar or excess amounts of polyepoxide have been used during reaction with the di-2-oxazolines to produce crosslinked epoxide structure.

It is the primary object of the present invention to produce linear polymers from the reaction of polyepoxides and an excess of di-2-oxazolines which polymers are characterized by having a long shelf life and which are capable of being cured to tough, resinous polymers which are particularly useful as self-adherent chemical and corrosion resistant coatings for solid substrates, such as metals.

SUMMARY

The above and related objects are attained by reaction at a temperature of between about 100° C. and 150° C., under autogenous pressure, of (1) a polyepoxide having an average of more than one 1,2-epoxyaliphatic group per molecule with (2) at least 2 equivalents, per equivalent of polyepoxide, of a di-2-oxazoline of the formula

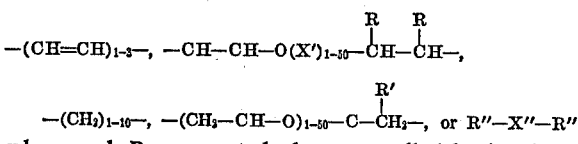

wherein X represents $-(CH=CH)_{1-3}-$, $-CH-CH-O(X')_{1-50}-\overset{R}{\underset{|}{C}}H-\overset{R}{\underset{|}{C}}H-$,

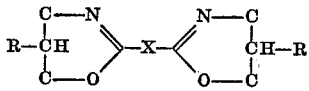

$-(CH_2)_{1-10}-$, $-(CH_2-CH-O)_{1-50}-C-CH_2-$, or $R''-X''-R''$ where each R represents hydrogen or alkyl having from 1 to 4 carbon atoms; X' represents ethyleneoxy or propyleneoxy; R' represents hydrogen or alkyl having from 1 to 3 carbon atoms; X'' represents oxygen or sulfur; and R'' represents alkylene of from 2 to 20 carbon atoms, arylene of from 6 to 10 carbon atoms, or arylalkylene of from 7 to 15 carbon atoms, followed by curing the same, if desired, by the addition of curing amounts of dicarboxylic acids, isocyanates, anhydride or additional epoxide.

DESCRIPTION OF THE PREFERRED EMBODIMENTS

The polyepoxide employed in the preparation of the curable and cured compositions of the present invention may be any of the known curable polyepoxides. Especially useful are those compounds having an average of more than one 1,2-epoxy-aliphatic group per molecule and particularly the polyglycidyl ethers of polyhydric phenols such as the diglycidyl ether of bisphenols A and F; their partially halogenated counterparts such as the diglycidyl ether of tetrabrominated bisphenol A; epoxylated derivatives of the novolacs such as their reaction products under basic conditions with epichlorohydrin; and terminally epoxylated polyalkylene glycols such as the doubly epoxylated polyethylene and polypropylene glycols.

The di-2-oxazolines used in the present invention are known, e.g., as disclosed in Belgium Pat. 752,046, issued Dec. 16, 1970 and may be prepared by the procedures disclosed therein. In general, such compounds are prepared by any of a group of synthetic routes all of which pass, advantageously, through a cyano group; in the sense, that, at each molecular site where an oxazoline heterocycle is desired, there is provided as a precursor site, a cyano. From such site it is, in general, convenient and easy to go to the desired heterocycle. The only condition believed to be limiting is that, with respect to the reactions that go on from the cyano to the heterocycle, preferably the cyano be the most reactive or only significantly reactive site; or, if any other site on the starting cyano compound be more reactive than cyano, then known alternative procedures must be considered.

Exemplary of such di-2-oxazolines are 2,2'-oxydiethylenebis-2-oxazoline;
2,2'-thiodiethylenebis-2-oxazoline;
2,2'-oxybis(p-phenylenemethylene)bis-2-oxazoline;
2,2'-oxydi-p-phenylenebis-2-oxazoline;
2,2'-propylenebis(oxyethylene)bis-2-oxazoline;
2,2'-ethylenebis(oxyethylene)bis-2-oxazoline;
2,2'-vinylenebis-2-oxazoline;
2,2'-vinylenebis(methyl-2-oxazoline);
2,2'-(1,3-butadienylene)bis-2-oxazoline and
2,2-tetramethylenebis-2-oxazoline.

The linear, curable polymers of the present invention are formed by reaction, under temperatures of from about 100° C. to 150° C. under autogenous pressures, of the polyepoxide and an excess of di-2-oxazoline, i.e., with at least 2 equivalents of di-2-oxazoline per equivalent of polyepoxide and preferably from about 3 to 4 equivalents of di-2-oxazoline per equivalent of polyepoxide. The resulting linear, curable reaction product may subsequently be cured with curing amounts of diisocyanates, dicarboxylic acids, anhydrides, diphenols or additional epoxide to provide materials having excellent adhesion to metal with accompanying good corrosion and chemical resistance.

The following example is intended to illustrate the present invention, but is not to be construed as limiting its scope.

EXAMPLE

A. Preparation of Linear, Curable Reaction Product of Polyepoxide and Excess Di-2-Oxazoline A mixture of 85 grams (0.25M) of a diglycidyl ether of bisphenol A (p,p'-isopropylidenediphenol) having an epoxy equivalent weight of 186–192 and 171 grams (0.75M) of 2,2-thiodiethylene bis-2-oxazoline was heated with stirring under autogenous pressures at a temperature of 120° C.±3° for a period of 5 hours. The resulting product was allowed to cool to room temperature, then dissolved in 750 ml. of chloroform and extracted with water. The chloroform solution was dried over sodium sulfate, filtered and the solvent removed under vacuum. The product was a clear yellow oil which weighed 112 grams and had a viscosity of about 670,000 cps. The viscosity of the reaction product increased with time as set forth in the following Table I:

TABLE I

| Experiment number | Time (at ca. 25° C.) | Product viscosity (cps.) |
|---|---|---|
| 1 | 5 hrs | 670,000 |
| 2 | 5 days | 750,000 |
| 3 | 13 days | 960,000 |
| 4 | 32 days | 1,000,000 |

The above data illustrate that the reaction product is characterized by desirably long shelf life. Further, such reaction product was essentially linear in structure and soluble in conventional solvents.

B. Curing of the Reaction Product of (A) Above

To 100 grams of the product of "A" above, having a viscosity of about 670,000 cps., was added with stirring 10 grams of toluene diisocyanate. The mixture became warm immediately upon admixture and after 15 minutes was too thick to pour. Tables for testing purposes were prepared by warming the admixture to about 50° C. The tabs were then cured at 120° C. for varying periods of time. The following Table II sets forth the cure times and the notched impact and heat distortion values for each material.

TABLE II

| Cure time (minutes) | Notched impact (ASTM D-256) | Heat distortion (ASTM D-648) |
|---|---|---|
| 30 | 0.45 | 58 |
| 60 | 0.66 | 75 |
| 120 | 0.57 | 75 |
| 180 | 1.02 | 85 |

What is claimed is:

1. A process for preparing cured products which are particularly suited as self-adherent corrosion and chemical resistant coatings for metals, comprising
   (A) preparing a curable, linear prepolymer by reaction at a temperature of between about 100° C. and 150° C. under autogenous pressure of (1) a polyepoxide having an average of more than one 1,2-epoxyaliphatic group per molecule with (2) at least 2 equivalents per equivalent of polyepoxide of a di-2-oxazoline of the formula

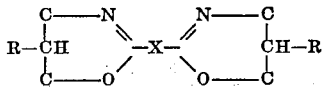

wherein X represents

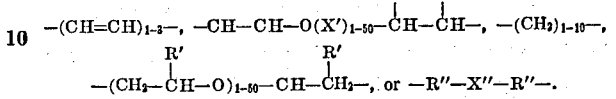

where each R represents hydrogen or alkyl having from 1 to 4 carbon atoms; X' represents ethyleneoxy or propyleneoxy; R' represents hydrogen or alkyl having from 1 to 3 carbon atoms; X" represents oxygen or sulfur; and R" represents alkylene of from 2 to 20 carbon atoms, arylene of from 6 to 10 carbon atoms, or arylalkylene of from 7 to 15 carbon atoms, and
   (B) curing said prepolymer by heating said prepolymer in the presence of curing amounts of an aromatic diisocyanate.

2. The process of Claim 1 wherein said polyepoxide is a diglycidyl ether of bisphenol A with epichlorohydrin having an epoxy equivalent weight of from about 186–192.

3. The process of Claim 2 wherein said di-2-oxazoline is 2,2-thiodiethylene bis-2-oxazoline.

4. The process of Claim 3 wherein said diisocyanate is toluene diisocyanate.

5. A cured product prepared by the process of Claim 1.

References Cited

UNITED STATES PATENTS

| 3,639,395 | 2/1972 | Tomalia | 260—47 |
| 3,670,046 | 6/1972 | Tomalia et al. | 260—47 |
| 3,630,996 | 12/1971 | Tomalia | 260—47 |
| 2,906,723 | 9/1959 | Reese | 260—47 |

WILLIAM H. SHORT, Primary Examiner

T. E. PERTILLA, Assistant Examiner

U.S. Cl. X.R.

117—132 BE, 161 ZB; 260—2 N, 59, 77.5 AM